United States Patent [19]

Steine et al.

[11] 4,011,056

[45] Mar. 8, 1977

[54] QUINARY SILVER ALLOY

[75] Inventors: Hans T. Steine, Crissier; Rene Wasserman, Echichens; Wolfgang Simm, Lausanne, all of Switzerland

[73] Assignee: Eutectic Corporation, Flushing, N.Y.

[22] Filed: June 6, 1975

[21] Appl. No.: 584,406

[30] Foreign Application Priority Data

June 12, 1974  Switzerland .................... 8010/74

[52] U.S. Cl. .................... 29/199; 75/134 N; 75/134 B; 75/134 C; 75/173 C
[51] Int. Cl.² .................... C22C 30/02
[58] Field of Search ......... 75/134 N, 134 B, 134 C, 75/173 C; 29/199

[56] References Cited

UNITED STATES PATENTS

| | | | |
|---|---|---|---|
| 1,899,873 | 2/1933 | Leach | 75/173 C |
| 2,138,638 | 11/1938 | Leach | 75/173 C |
| 2,192,456 | 3/1940 | Streicher | 75/173 C |
| 2,270,594 | 1/1942 | Leuser | 75/173 C X |
| 3,539,339 | 11/1970 | Knotek | 75/134 C |
| 3,862,838 | 1/1975 | Sloboda et al. | 75/134 C |

*Primary Examiner*—L. Dewayne Rutledge
*Assistant Examiner*—E. L. Weise
*Attorney, Agent, or Firm*—Hopgood, Calimafde, Kalil, Blaustein and Lieberman

[57] ABSTRACT

A quinary silver alloy containing copper, zinc and tin as essential elements and also including effective amounts of silicon, is provided capable of a variety of uses and having particular utility as a solder or brazing alloy, the alloy having the following composition by weight:

35 — 48% Ag
25 — 35% Zn
0.5 — 3.5% Sn
0.01 — 0.4% Si
0 — 1% Ni
0 — 1% Pd
0 — 0.5% P
balance — essentially Cu.

10 Claims, No Drawings

QUINARY SILVER ALLOY

This invention relates to a quinary silver alloy and, in particular, to a silver-copper zinc-tin alloy capable of a variety of uses, including utility as a solder or brazing alloy.

State of the Art

Alloys of silver-copper-zinc, with and without tin, are well known for such uses as electrical components in the electrical industry, for the manufacture of cutlery and silverware, for the production of ornaments in the jewelry industry and as solder or brazing material in the form of wires, rod, strip, powder and other shapes. Depending upon the use of the alloy, the composition may also contain such elements as Pd, Cd and the like.

In Volume 6 of the Metals Handbook entitled Welding and Brazing (The American Society of Metals, 1971), silver alloy filler metals are disclosed as brazing alloys for the torch brazing of low-carbon and low-alloy steel parts, among other metal parts. According to page 627 of the Handbook, a group of cadmium-containing silver brazing alloys is disclosed falling within the range comprising by weight about 30 to 50% Ag, about 15 to 27% Cu, about 16 to 23% Zn and about 18 to 24% Cd. A disadvantage of the foregoing composition range is in the use of cadmium which is a highly toxic metal, the use of which in many cases is against the law, especially in the food industry.

High silver-content alloys are generally preferred but, due to the steep rise in silver prices in recent years, the trend has been to lower the silver content in most alloys and to omit the cadmium because of its toxicity. However, maintaining the silver content to substantially below 50% and omitting the cadmium generally resulted in a decrease in ductility and deformability. Moreover, certain of the alloys tended to exhibit inferior wetting properties with respect to metal substrates which was not conductive to good quality brazing. In addition, the melting range of such alloys tended to be relatively high compared to alloys containing substantial amounts of cadmium. Replacing cadmium with tin presents the problem of embrittlement as to certain of the low silver compositions which adversely affected the ductility and deformability as to these alloys. Thus, tin additions were generally made to silver alloys containing over 50% silver. For example, on page 627 of the aforementioned Metals Handbook, a braze alloy containing 56% Ag, 22% Cu and 17% Zn and also containing 5% Sn is disclosed.

It would thus be desirable to provide a cadmium-free quinary silver alloy in which the silver content is less than 50%, which is easily machinable, has a relatively low melting range, good ductility and deformability and which flows easily when casting shapes and has good wettablility as a brazing alloy.

OBJECTS OF THE INVENTION

It is thus the object of the invention to provide a quinary silver alloy which is substantially cadmium-free, which contains less than 50% by weight of silver and which is capable of a wide variety of uses.

Another object is to provide an improved quaternary silver brazing alloy substantially free of cadmium and containing as essential ingredients copper, zinc and tin together with an effective amount of silicon.

A further object is to provide as an article of manufacture a casting made of a quinary silver alloy.

Still another object is to provide a brazed joint made of a quinary silver brazing alloy.

These and other objects will more clearly appear when taken in conjunction with the following disclosure and the appended claims.

Statement of the Invention

It has been discovered that by judiciously controlling the elements of the composition over a fairly narrow range, a quinary silver alloy having substantially all of the desired properties may be provided. This is achieved by controlling the composition so that it contains by weight about 35 to 48% Ag, about 25 to 35% Zn, about 0.5 to 3.5% Sn, 0.01 to 0.4% Si, up to about 1% Ni, up to about 1% Pd, up to about 0.5% P and the balance essentially copper. Preferably, the tin content may range from about 1% to 3.5%, the silicon content from about 0.03% to 0.25% and phosphorous from about 0 to about 0.1%.

By working over the foregoing narrow range, especially with tin present which normally has an embrittling effect, an easily castable and extrudable alloy is obtained which is deformable, which exhibits good wetting properties as a brazing alloy, which provides the desired capillary flow in forming brazed joints and which also provides a relatively low melting range, normally obtainable with cadmium additions. A further advantage of the foregoing composition is that the vaporization of zinc is greatly inhibited during melting of the alloy.

The alloys can be electrolytically polished in the conventional manner to provide a color similar to German silver, an alloy known by the trade name ALPACA (60% Cu, 19.7% Zn, 15% Ni, 2% Ag and balance residuals) and similar to common stainless steels. In addition, the alloy of the invention may be used in brazing metal parts in food industry equipment without the toxic effects of cadmium which is omitted from the composition.

A preferred alloy composition comprises about 38 to 46% Ag, about 26 to 32% Zn, about 1.5 to 3% Sn, about 0.05 to 0.15% Si, up to about 0.5% Ni, up to about 0.5% Pd, up to about 0.05% P and the balance essentially copper.

DETAILS OF THE INVENTION

As illustrative of the detail aspects of the invention, the following examples are given:

EXAMPLE 1

Using the well known shell molding process, ornamental parts were produced from the following alloy comprising by weight:
48% Ag
35% Zn
2% Sn
0.4% Si
0.4% P
bal. Cu This alloy exhibited excellent flow properties, filled the mold accurately and the parts produced exhibited good resistance to oxidation.

EXAMPLE 2

An alloy composition was provided in accordance with the invention from which axles were produced for measuring devices used in water purifying plants. Such devices are normally subjected to heavy corrosion. The devices withstood the corrosive attack. The alloy had the following composition by weight:

35% Ag
32% Zn
3% Sn
0.15% Si
1% Ni
1% Pd
Bal. Cu

EXAMPLE 3

An alloy of the following composition:

46% Ag
26% Zn
1% Sn
0.05% Si
Bal. Cu was used as a brazing agent for the joining of stainless steel parts in the production of equipment for milk plants. The braze alloy exhibits good capillary flow in forming brazed joints between the steel parts of the equipment. Since the braze alloy is free of cadmium, it meets the requirements of food laws concerning toxicity.

EXAMPLE 4

An alloy of the following composition:

46% Ag
26% Zn
3% Sn
0.1% Si
Bal. Cu is used as a brazing agent for joining watch case parts made of ALPACA and stainless steel by furnace brazing. This alloy does not show zinc vaporization during melting. The alloy could be electrolytically polished.

As is evident from the foregoing, the alloy composition of the invention is capable of many uses. It may be used to make castings with detail designs, such as shell-mold castings; corrosion resistant metal parts; brazed joints and the like. A brazed joint comprises two metal parts joined together with the alloy of the invention.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A quinary Ag-Cu-Zn-Sn-Si alloy having the following composition consisting essentially by weight of about 35 to 48% Ag, about 25 to 35% Zn, about 0.5 to 3.5% Sn, about 0.01 to 0.4% Si, 0 to about 1% Ni, 0 to 1% Pd, 0 to 0.5% P and the balance essentially copper.

2. The alloy of claim 1, wherein Sn ranges from about 1 to 3.5%.

3. The alloy of claim 1, wherein the composition consists essentially by weight of about 38 to 46% Ag, about 26 to 32% Zn, about 1.5 to 3% Sn, about 0.05 to 0.15% Si, 0 to about 0.5% Ni, 0 to about 0.5% Pd, 0 to about 0.05% P and the balance essentially copper.

4. The alloy of claim 1, wherein Si may range from about 0.03% to 0.25%.

5. The alloy of claim 1, wherein P may range from 0 to about 0.1%.

6. As an article of manufacture, a casting made of a quinary Ag-Cu-Zn-Sn-Si alloy consisting essentially by weight of about 35 to 48% Ag, about 25 to 35% Zn, about 0.5 to 3.5% Sn, about 0.01 to 0.4% Si, 0 to about 1% Ni, 0 to 1% Pd, 0 to 0.5% P and the balance essentially copper.

7. The article of manufacture of claim 6, wherein the composition thereof consists essentially by weight of about 38 to 46% Ag, about 26 to 32% Zn, about 1.5 to 3% Sn, about 0.05% to 0.15% Si, 0 to about 0.5% Ni, 0 to about 0.5% Pd, 0 to about 0.05% P and the balance essentially copper.

8. A brazed joint comprising metal parts joined together with a braze alloy consisting essentially by weight of about 35 to 48% Ag, about 25 to 35% Zn, about 0.5 to 3.5% Sn, about 0.01 to 0.4% Si, 0 to about 1% Ni, 0 to 1% Pd, 0 to 0.5% P and the balance essentially copper.

9. The brazed joint of claim 8, wherein the braze has a composition consisting essentially by weight of about 38 to 46% Ag, about 26 to 32% Zn, about 1.5 to 3% Sn, about 0.05 to 0.15% Si, 0 to about 0.5% Ni, 0 to about 0.5% Pd, 0 to about 0.05% P and the balance essentially copper.

10. The brazed joint of claim 8, wherein said joint is a part of food processing equipment.

* * * * *